(12) United States Patent
Mallow et al.

(10) Patent No.: US 6,376,022 B1
(45) Date of Patent: Apr. 23, 2002

(54) PROTECTIVE COATING AND METHOD

(75) Inventors: William A. Mallow, Helotes; Clifford A. Moses; Henry L. Bernstein, both of San Antonio, all of TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 09/526,818

(22) Filed: Mar. 16, 2000

Related U.S. Application Data

(63) Continuation-in-part of application No. 09/078,770, filed on May 14, 1998, now abandoned.

(51) Int. Cl.$^7$ .................................................. B05D 3/02
(52) U.S. Cl. .................. 427/397.8; 427/379; 427/376.4
(58) Field of Search .............................. 427/376.4, 379, 427/397.8

(56) References Cited

U.S. PATENT DOCUMENTS

| | | | |
|---|---|---|---|
| 3,285,757 A | * 11/1966 | Cornely | ........................ 106/57 |
| 3,620,791 A | 11/1971 | Krupnick | |
| 3,656,975 A | 4/1972 | Phelps, Jr. et al. | |
| 3,779,816 A | * 12/1973 | Mao | ........................... 148/6.3 |
| 3,990,903 A | * 11/1976 | Mallow | ....................... 106/84 |
| 4,030,939 A | 6/1977 | Mallow | |
| 4,036,655 A | 7/1977 | Yamada et al. | |
| 4,130,440 A | 12/1978 | Nose et al. | |
| 4,235,836 A | 11/1980 | Wassell et al. | |
| 4,332,618 A | 6/1982 | Ballard | |
| 5,330,794 A | * 7/1994 | Bosco et al. | ................. 427/387 |
| 5,411,804 A | 5/1995 | Sugitani | |
| 5,468,290 A | 11/1995 | Kelley | |
| 5,716,670 A | * 2/1998 | Park et al. | ................... 427/212 |

FOREIGN PATENT DOCUMENTS

JP          53-20048          6/1978

\* cited by examiner

*Primary Examiner*—Michael Barr
(74) *Attorney, Agent, or Firm*—Paula D. Morris & Associates, P.C.

(57) ABSTRACT

A thermal barrier protective coating composition having a thickness sufficient to protect a metal surface against heat, vibration, corrosive, and environmental damage and a method for making the same. The coating composition comprises polymerizable spray-dried hydrated sodium silicate powder, a forming agent, and lightweight ceramic microspheres is disclosed.

157 Claims, No Drawings

PROTECTIVE COATING AND METHOD

This application is a Continuation-in-part and claims the benefit of application Ser. No. 09/078,770 filed May 14, 1998 now abandoned.

STATEMENT REGARDING FEDERALLY SPONSORED RESEARCH

The United States Government has a paid-up license in this invention and the right in limited circumstances to require the patent owner to license others on reasonable terms as provided for by the terms of Contract No. NAS 327720 awarded by the National Aeronautics and Safety Administration.

FIELD OF THE INVENTION

The present invention relates to coatings that protect and insulate surfaces from high temperatures.

BACKGROUND OF THE INVENTION

At the present time TBC's are used to protect metal components exposed to high temperatures by reducing the temperature of the metal. For example, in gas turbines they are used on combustion hardware, after burners, vanes, blades, fuel nozzles and spray bars. More particularly, these fuel nozzles operate in an envelope of 700° F. to 1300° F. air. The fuel nozzles will become clogged if the temperature of the fuel becomes greater than about 400° F. because the fuel will form deposits at these high temperatures. The fuel is, of course, used to provide the energy to the turbine section of the gas turbine engine in order to produce useful thrust, work and/or heat. The primary cause of the fuel becoming too hot is from the heat of the air surrounding the fuel nozzle. The purpose of the TBC is to reduce the amount of heat flowing from this air into the fuel nozzle, and thence, into the fuel.

The difficulties encountered in making a suitable TBC are based on the fact that such protective coating must have a large number of mechanical and thermal properties. The TBC's must be capable of adhering to the metal and capable of being adhered thereto by a simple and low cost method. Also, the TBC's must protect the metal against heat, corrosion, and environmental damage.

TBC's currently in use for fuel nozzles are made by a plasma spray process. Those used for blades and vanes may also be made by an electron-beam, physical deposition process, but this is a very costly process. The plasma spray processes are inherently chaotic in nature, can be difficult to control and can produce unacceptable coatings while still using nominally the same materials and processing conditions. Such unacceptable coatings are those that readily suffer vibrational and/or thermal cycling damage, detachment from the metal surface and subsequent obstruction by the debris of critical air passages in the fuel nozzles. Plasma spray processes are also relatively expensive and require specialized set-up and long processing times.

SUMMARY OF THE INVENTION

The present invention provides a composition and a method for coating surfaces. The method comprises contacting a surface comprising metal with the coating composition. The coating composition has a polymerizable hydrated silicate powder comprising alkali metal ions, a forming agent comprising polyvalent metal ions, and an amount and form of moisture effective to promote ion exchange between the polyvalent metal ions and the alkali metal ions. The coating composition is cured under first curing conditions and for a time effective to 1) initiate polymerization of the silicate powder, and 2) to promote the ion exchange, producing an intermediate coating composition comprising bound water molecules. The first curing conditions are effective to maintain a sufficient amount of the moisture in the coating composition to promote ion exchange while under the first curing conditions. Sufficient energy is imparted to the coating composition at a rate and under second curing conditions effective to drive the bound water molecules from the intermediate coating composition and to produce a durable, adhesive protective coating.

DETAILED DESCRIPTION OF THE INVENTION

The instant coating composition adheres to metal surfaces and has excellent mechanical, thermal barrier, and environmental protective properties. These properties are achieved using a combination of a polymerizable silicate composition and a forming agent cured under conditions effective to remove substantially all of the water from the resulting coating.

The coating composition is formed using a polymerizable spray-dried hydrated alkali metal silicate powder. Any polymerizable spray-dried hydrated alkali silicate powder may be used in the present invention. Briefly, the powder is prepared by conventionally spray drying a solution of alkali metal silicate under conditions effective to produce a free-flowing powder. One example of a suitable polymerizable spray-dried hydrated alkali silicate powder can be found in U.S. Pat. No. 4,030,939. Sodium silicate powder is preferred due to its wide availability and low cost. The spray-dried hydrated sodium silicate powder preferably has a ratio of $SiO_2/Na_2O$ of from about 2 to 1 to about 3.5 to 1, most preferably 2.4:1. Such powders are commercially available under the trademark BRITESIL sold by Philadelphia Quartz Corp.

In order to form the coating, a forming agent capable of forming weak acids is combined with the alkali metal silicate powder. Suitable forming agents include but are not necessarily limited polyvalent metal ions, such as zinc, aluminum, and zirconium, and mixtures thereof Preferably, the forming agent is in a finely ground state, from about minus 200 mesh (Tyler Standard) to about minus 400 mesh, most preferably about 5μ or less. The smallest available particle size is desirable because it minimizes the reaction time and increases the rate at which alkali silicate is converted to polysilicic acid. In a preferred embodiment, from about 5 to about 20 parts by weight forming agent is added.

For optimum strength and resistance against shock, it is preferred to add certain siliceous fillers which can also react in forming the preferred protective coating. When the coating is heated to greater than 1,000° F., the fillers will mineralize and hybridize to the corresponding silicate. Such materials include siliceous sand, silica flour, fly ash clays, other argillaceous materials of high silicate content including, rice hull, diatomaceous silica, volcanic ash or mixtures thereof. Of these, silica flour is preferred due to its high availability and low price. For optimum reaction, finely ground filler materials, such as minus 200 mesh (Tyler Standard) should be used.

The coating composition is mixed with water and it has been found that for optimum strength, integrity and continuity of the coatings; namely, to prevent shrinking, cracks and the like, it is preferred to have a ratio of water to spray-dried hydrated sodium silicate powder of from about 0.9:1 to about 1.1:1. Limiting the amount of water is important to provide low porosity, final strength integrity and the desired application properties, such as trowelable, injectable, and castable rheologies. The composition can vary from Newtonian to thixotropic slurries depending on the application method to be used; i.e., dip coating, injection into fine capillaries and annuli, spray coating, or other conventional coating techniques.

Without being bound to any particular theory, it is believed that a polymerization reaction takes place as the forming agent hydrolyzes in the presence of water to liberate small quantities of ionic metal oxides and/or hydroxides. (e.g. $Zn^{++}$, $(OH)_2^-$). The liberated ions induce a steady polymerization of silicic acid hydrogel which is liberated by the neutralization of sodium silicate by, for example, by ion exchange with the polyvalent metal ions. As the ionized metal is consumed it is converted into a silicate polymer of high molecular weight products that solidifies around the filler, binding the material together. The siliceous and uniquely charged colloidal silica hydrogel attacks metal and mineral surfaces to provide the basis for forming a silicate bond to that surface. One example of a divalent metal/$SiO_2$ polymerization is illustrated by the following formula:

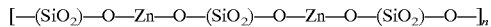

where n is from about 1,000 to about 1,000,000, preferably from about 10,000 to about 1,000,000.

In a preferred embodiment, lightweight ceramic microspheres having insulative properties are used in the coating composition. The microspheres provide heat resistance and reduce the overall density of the resulting coating. Suitable microspheres are made in various diameter size and are commercially available from companies such as Philadelphia Quartz Corp., 3M Corp. and the like. The preferred microspheres are hollow ceramic spheres and can be utilized in various micron sizes, where hollow spheres having a size of 5–200 μm are most suitable and economical. In a preferred embodiment, said microspheres comprise from about 10 to about 48 parts by weight of said coating composition.

Preferably heat resistant whiskers and/or fibers are added to the composition to provide resistance to shrinkage and thermal stressing. The length of the whiskers and/or fibers can vary, but ordinarily the whisker sizes may range from 5–100 μm in length and the fibers range from 300–3550 μm in length.

A wide range of proportions of materials can be utilized and the table that follows sets forth an operative range and the preferred range of materials.

| Materials | Parts by Weight | |
| --- | --- | --- |
| | Operative | Preferred |
| Spray-dried hydrated sodium silicate powder | 10–24 | 18 |
| Ceramic microspheres | 0–48 | 20 |
| Forming agent | 5–16 | 12 |
| Silica flour | 0–40 | 30 |
| Heat resistant whiskers and/or fibers | 0–30 | 2 |
| Water | 14–23 | 17 |
| Bentonite | 0–5 | 2 |

To form the coating composition, the components noted above are thoroughly admixed, vibrated and evacuated to ensure that all entrapped air is removed, and the resulting aqueous slurry is applied to a metal surface to the desired thickness or injected into cavities and/or annuli. The coating composition when formed may be somewhat thixotropic and can be built up to various thicknesses or reduced to a Newtonian fluid. Bentonite may be used to adjust the thickness of the composition depending upon the desired application properties. The optimum thickness of any particular coating is readily calculable by routine experimentation and is based mainly on the temperature to which the metal is to be exposed with higher temperatures requiring thicker coatings. Ordinarily, it has been found that suitable protective coatings can be formed with temperatures up to 2,000° F. by having a coating thickness of 0.5–6 mm. As noted, the optimum thickness for any particular metal composition can be determined by routine experimentation by simply coating the composition to various thicknesses and noting the properties of the coating after being exposed to the temperature conditions.

The resulting coating is a silica polymer matrix comprising silica, polysilicic acid, Si-polyvalent metal ion complexes and high ratios of $NaO(SiO_2)n$ where n is greater than about 2.4, preferably from about 100 to about 1000. The liberated sodium is mineralized by the silica fillers and fly ash silicates. The silica, and Si-polyvalent metal ion complexes have a particle size effective to produce coatings having a thickness of 10 mm or less, depending upon the end use for the article being coated. The polysilicic acid and Si-polyvalent metal ion complexes are substantially free of bound water molecules. The insulative ceramic microspheres are uniformly embedded in the matrix. Substantially free of bound water molecules is used herein to mean a coating that will not delaminate, liquefy, or flake when subjected to heat treatments that surround the coated article at temperatures above about 1,000° F.

In a preferred embodiment, the coating is cured slowly with increasing heat to produce chemically bonded and cured coatings that are highly adherent to metals and resistant to delamination, cracking and flaking during use, when exposed to rapid heat at temperatures in excess of 2,000° F. More particularly, the coating is initially cured in a closed environment overnight, preferably from about 8 to about 24 hours, more preferably from about 8 to about 20 hours, and most preferably from about 8 to about 10 hours, at ambient temperature (ie. about 70° F. to about 80° F). "Closed environment" is used herein to mean an environment that is sealed from air flow such that substantially all of the air inside the container is not allowed to mix with air outside the container and a water content of at least 15% is maintained in the environment to facilitate the curing reaction. Likewise, open environment means that the air in the container is allowed to mix with air outside the container. The coating then is cured at a temperature of from about 150° F. to about 250° F. for about 3 hours at a pressure of from about 4 psi to about 135 psi. The stoichiometric ratio of the polyvalent metal ion to the alkali metal silicate is at least 1 to assure complete ion exchange between the polyvalent metal ions and the silicate to convert the mixture to an insoluble silicate polymer.

Without being bound by any particular theory, applicant believes the initial ambient temperature cure combined with the subsequent relatively mild heat curing step facilitates the ion exchange between the polyvalent metals (e.g. Zn, Zr, Al) and the alkali metal silicate powder to form the silicate polymer or ceramic product. Preferably, the coated articles are heated in an environment that provides uniform heat surrounding the coated article. A closed environment is preferred so that the water present in the coating composition is available to promote the ionization of the polyvalent metals such that they then react with the alkali metal silicate molecules to polymerize the composition. Complete or near complete ion exchange is important in order to assure the absence in the cured coating of un-reacted, water soluble akali metal silicates in the coating. If un-reacted water soluble alkali metal silicates are not bound during the polymerization they could cause the coating to melt, liquefy, flux and fail when exposed to temperatures in excess of 1,000° F.

The coating is subsequently heated at increasing temperatures starting at about 250° F. and increasing at a rate of about 20° F. or less per minute to about 1,000° F. or more in an open environment at atmospheric pressure. The gradual increase in temperature is believed to effectively remove water bound to the polyvalent metal (i.e.

Si—OH) at a rate that avoids disruption of the coating. Once the temperature reaches 1,000° F., the article is allowed to cool to ambient temperature. The gradual increase in temperature removes bound water from the coating so that the bound water is not available to distill upon rapid heating and cause the coating to crack or delaminate.

The invention will be further described in connection with the following examples which are set forth for purposes of further illustration only.

EXAMPLE 1

A coating composition was prepared by thoroughly mixing the materials noted in Table I below. The mixture was vibrated and evacuated to remove any untrapped air. The density of the coating composition was 1.05 gm/cm$^3$.

TABLE I

| Material | Parts by Weight |
| --- | --- |
| BRITESIL C-24 (2.44:1 ratio SiO$_2$/Na$_2$O) | 14 |
| Zinc oxide | 10 |
| Silica flour (−200 mesh) | 20 |
| Silicon Carbide whiskers (5–100µ) | 10 |
| *ZELAN (ceramic microspheres-(5–200) µ diameter) | 16 |
| Water | 14–15 |

*3M Corp.

Stainless steel plates 2"×3"×⅛" were coated with 0.5 mm to 6 mm thick coating of the composition and cured at ambient temperature for at least 2 hours in a closed environment followed by 150° F. for 2 hours.

The coated plates were subjected to a battery of tests.

The coated plates were subjected to direct flame impingement with a flame having a temperature of ~1,700 to 2,000° F. for two hours. There was glazing of the coating surface, but no damage to the coating or metal surface was noted.

Impact by localized hammer blows to the coated plates created only localized strain, crushing, and cracking, but the cracking did not propagate beyond the impact zone. The coating could be crushed to half it's thickness without serious adverse effect on adhesion or on the peripheral areas.

Bars of the coating composition itself (10"×1"×1") were cast, tested for freeze/thaw resistance by being cooled to −20° F. and then immersed in ambient temperature water for 20 cycles. No damage or stress to the coating was noted.

The coating was tested and had the following mechanical and thermal properties:

A. Mechanical:
Compressive Strength (2" cubes): 2,000 to 4,000 psi
Flexural Strength (10"×1":×1" bars): 750 to 1,200 psi
B. Thermal:
Specific heat: 0.835 w-s/gmK @23° C. to 1.15 w-s/gmK @700° C.
Thermal Conductivity: 720° F. 2.0 btu in./fr$^2$ hr ° F.
C. Coefficient of Thermal Expansion: 6 to ~7 to 7.5×10$^{-6}$ from 230° to 650° C.

It has been found that EXTENDOSPHERE, spheres from fly ash, sold by Philadelphia Quartz Corp. can be substituted for ZELAN with equivalent results.

EXAMPLE 2

The same procedure as set forth in Example 1 was followed using the same materials in the composition, but the proportions set forth in Table II below. The density of the coating was 0.85 gm/cm$^3$.

TABLE II

| Material | Parts by Weight |
| --- | --- |
| BRITESIL C-24 | 18 |
| Zinc oxide | 12 |
| Silica flour (−200 mesh) | 20 |
| Silicon Carbide whiskers (5–100µ) | 10 |
| ZELAN | 16 |
| Water | 16–17 |

The same testing was done as in Example 1 and the same results were noted for the freeze/thaw; direct flame impingement, and impact tests. The mechanical and thermal properties were as follows:

A. Mechanical
Compressive Strength—5,200 psi
Flexural Strength—1,400 psi
B. Thermal:
Specific heat—0.80 w-s/gmK @23° C. to 1.15 w-s/gmK @700° C.
Thermal Conductivity: 675° F.—2.0 btu in./fr$^2$ hr° F.
C. Coefficient of Thermal Expansion—6 to ~7 to 7.5×10$^{-6}$ from 230° to 650° C.

EXAMPLE 3

The composition of Example 2 was utilized, except that the ZELAN was eliminated, and the same testing applied.

Substantially identical mechanical and thermal properties were noted.

However, this coating was less resistant to thermal cracking when applied to cylindrical surfaces and cycled to 1,200° F. The presence of whiskers apparently dissipates expansive and contractive stresses as micro strains and minimizes thermal cracking with no loss of adhesion or integrity of coating.

EXAMPLE IV

Metal coupons were coated with the coating composition outlined in Example I to a thickness greater than 100 mil. The coated coupons were cured in a closed environment for about 12 hours at ambient temperature. The coupons then were heated from 10° F. to 1000° F. at a rate greater than 20° F./min. at atmospheric pressure. All of the coatings delaminated and flaked off of the metal surface when subjected to thermal shock. It was concluded that these results were due to lack of curing at increasing temperatures to remove the free sodium silicate present in the coating composition.

EXAMPLE V

Metal coupons were coated with the coating composition outlined in Example I to thicknesses of from 100 mil. to 250 mil. The coupons were cured at ambient temperature in a closed environment for about 12 hours. The coupons then were heated at 250° F. to 350° F. for about 3–4 hours at a pressure of 30–135 psi in a closed environment. The temperature was then increased to 1,000° F. a rate of 10° F.–15° F./min in an open environment. The coatings did not delaminate or flake when subjected to direct flame impingement at 1,800° F. In addition, the coatings did not delaminate or flake when the uncoated side of the coupon was subjected to direct flame impingement at 1,800° F. Applicant's attributed this result to the heating step at 250–350° F. in a closed environment that encourages polymerization and the final heating step that removes the free and bound water from the composition.

The coating composition disclosed herein may be used to coat fuel nozzles, manifolds, and other items that are exposed to high temperatures. The particular application will dictate the thickness of the coating. If a thickness greater than 100 mil. is desired, the optimum curing temperature and rate should be determined by testing taking into account the heat source, the size of the coated article, and the uniformity of mass and thickness of the article and the nature of the article. It should be noted that the coatings described herein are also useful as insulators such as, containing heat inside a particular component.

While the invention has been described in connection with a preferred embodiment, it is not intended to limit the scope of the invention to the particular form set forth, but on the contrary, it is intended to cover such alternatives, modifications, and equivalents as may be included within the spirit and scope of the inventions as disclosed and claimed herein.

What is claimed is:

1. A method comprising:
   contacting a surface comprising metal with a coating composition comprising a polymerizable hydrated silicate powder comprising alkali metal ions, a forming agent comprising polyvalent metal ions, and an amount and form of moisture effective to promote ion exchange between said polyvalent metal ions and said alkali metal ions, producing a coated surface;
   maintaining said coated surface in a closed environment at a first temperature for a first period of time; and
   heating said coated surface to a second temperature for a second period of time;
   said first and second temperature and said first and second period of time comprising first curing conditions effective to initiate polymerization of said silicate powder and to promote said ion exchange, producing an intermediate coating composition comprising bound water molecules, said first curing conditions being effective to maintain a sufficient amount of said moisture in said coating composition to promote said ion exchange while under said first curing conditions; and
   imparting sufficient energy to said intermediate coating composition at a rate and under second curing conditions effective to drive said bound water molecules from said intermediate coating composition and to produce a durable, adhesive protective coating.

2. The method of claim 1 wherein said polyvalent metal ions are selected from the group consisting of zinc, aluminum, zirconium, and mixtures thereof.

3. The method of claim 1 wherein said second curing conditions comprise heating said intermediate coating composition to about 1,000° F. or more at atmospheric pressure.

4. The method of claim 3 wherein said rate is about 20° F./minute or less.

5. The method of claim 1 wherein said hydrated silicate powder comprises a spray-dried hydrated alkali metal silicate powder.

6. The method of claim 1 wherein said coating composition further comprises insulative microspheres.

7. The method of claim 1 wherein said coating composition comprises from about 10 to about 24 parts by weight polymerizable hydrated alkali silicate powder; from about 5 to about 20 parts by weight forming agent; and from about 14 to about 23 parts by weight water.

8. The method of claim 6 wherein said micropheres comprise from about 10 to about 48 parts by weight of said coating composition.

9. The method of claim 3 wherein said polyvalent metal ions are selected from the group consisting of zinc, aluminum, zirconium, and mixtures thereof.

10. The method of claim 1 wherein said coating composition further comprises a material selected from the group consisting of heat resistant whiskers, fibers and combinations thereof.

11. The method of claim 3 wherein said coating composition includes heat resistant whiskers and/or fibers.

12. The method of claim 1 wherein the stoichiometric ratio of said polyvalent metal ion to said hydrated silicate is at least 1.

13. The method of claim 1 wherein said first curing conditions comprises maintaining said coated surface in a closed environment at ambient temperature for a period of time.

14. The method of claim 13 wherein said period of time is from about 8 to about 20 hours.

15. The method of claim 1 wherein said first curing conditions comprise heating said intermediate coating composition under third conditions.

16. The method of claim 13 wherein said first curing conditions comprise heating said intermediate coating composition under third conditions.

17. The method of claim 14 wherein said first curing conditions comprise heating said intermediate coating composition under third conditions.

18. The method of claim 2 wherein said first curing conditions comprises maintaining said coated surface in a closed environment at ambient temperature for a period of time.

19. The method of claim 18 wherein said period of time is from about 8 to about 20 hours.

20. The method of claim 2 wherein said first curing conditions comprise heating said intermediate coating composition under third conditions.

21. The method of claim 18 wherein said first curing conditions comprise heating said intermediate coating composition under third conditions.

22. The method of claim 3 wherein said first curing conditions comprises maintaining said coated surface in a closed environment at ambient temperature for a period of time.

23. The method of claim 22 wherein said period of time is from about 8 to about 20 hours.

24. The method of claim 3 wherein said first curing conditions comprise heating said intermediate coating composition under third conditions.

25. The method of claim 22 wherein said first curing conditions comprise heating said intermediate coating composition under third conditions.

26. The method of claim 23 wherein said first curing conditions comprise heating said intermediate coating composition under third conditions.

27. The method of claim 4 wherein said first curing conditions comprises maintaining said coated surface in a closed environment at ambient temperature for a period of time.

28. The method of claim 27 wherein said period of time is from about 8 to about 20 hours.

29. The method of claim 4 wherein said first curing conditions comprise heating said intermediate coating composition under third conditions.

30. The method of claim 27 wherein said first curing conditions comprise heating intermediate coating composition under third conditions.

31. The method of claim 28 wherein said first curing conditions comprise heating said intermediate coating composition under third conditions.

32. The method of claim 5 wherein said first curing conditions comprises maintaining said coated surface in a closed environment at ambient temperature for a period of time.

33. The method of claim 32 wherein said period of time is from about 8 to about 20 hours.

34. The method of claim 5 wherein said first curing conditions comprise heating said intermediate coating composition under third conditions.

35. The method of claim 32 wherein said first curing conditions comprise heating said intermediate coating composition under third conditions.

36. The method of claim 33 wherein said first curing conditions comprise heating said intermediate coating composition under third conditions.

37. The method of claim 6 wherein said first curing conditions comprises maintaining said coated surface in a closed environment at ambient temperature for a period of time.

38. The method of claim 37 wherein said period of time is from about 8 to about 20 hours.

39. The method of claim 6 wherein said first curing conditions comprise heating said intermediate coating composition under third conditions.

40. The method of claim 37 wherein said first curing conditions comprise heating said intermediate coating composition under third conditions.

41. The method of claim 38 wherein said first curing conditions comprise heating said intermediate coating composition under third conditions.

42. The method of claim 12 wherein said first curing conditions comprises maintaining said coated surface in a closed environment at ambient temperature for a period of time.

43. The method of claim 42 wherein said period of time is from about 8 to about 20 hours.

44. The method of claim 12 wherein said first curing conditions comprise heating said intermediate coating composition under third conditions.

45. The method of claim 42 wherein said first curing conditions comprise heating said intermediate coating composition under third conditions.

46. The method of claim 43 wherein said first curing conditions comprise heating said intermediate coating composition under third conditions.

47. The method of claim 3 wherein said hydrated silicate powder comprises a spray-dried hydrated alkali metal silicate powder.

48. The method of claim 4 wherein said hydrated silicate powder comprises a spray-dried hydrated alkali metal silicate powder.

49. A method comprising:
contacting a surface comprising metal with a coating composition comprising a polymerizable hydrated silicate powder comprising alkali metal ions, a forming agent comprising polyvalent metal ions, and an amount and form of moisture effective to promote ion exchange between said polyvalent metal ions and said alkali metal ions;
curing said coating composition under first curing conditions and for a time effective to initiate polymerization of said silicate powder and to promote said ion exchange, producing an intermediate coating composition comprising bound water molecules, said conditions being effective to maintain a sufficient amount of said moisture in said coating composition to promote said ion exchange while under said first curing conditions; and
imparting sufficient energy to said coating composition at a rate and under second curing conditions effective to drive said bound water molecules from said intermediate coating composition and to produce a durable, adhesive protective coating;
wherein said first curing conditions comprise:
maintaining said coated surface in a closed environment at ambient temperature for about 8 to about 24 hours; and
heating said intermediate coating composition at a temperature of from about 150° F. to about 350° F. and pressure of from about 4 to about 135 psi for about 3 to about 5 hours.

50. The method of claim 49 wherein said polyvalent metal ions are selected from the group consisting of zinc, aluminum, zirconium, and mixtures thereof.

51. The method of claim 49 wherein said coating composition further comprises a material selected from the group consisting of heat resistant whiskers, fibers and combinations thereof.

52. A method comprising:
contacting a metal surface with a coating composition comprising a polymerizable hydrated silicate powder comprising alkali metal ions, a forming agent comprising polyvalent metal ions, and an amount and type of moisture effective to promote ion exchange between said polyvalent metal ions and said alkali metal ions;
curing said coating composition in a closed environment at ambient temperature for from about 8 hours to about 24 hours;
heating said metal surface for about 3 to about 5 hours at a temperature of about 150° F. to about 350° F. and at a pressure of from about 4 psi to about 135 psi;
increasing the temperature to about 1,000° F. or more, at a rate of about 20° F./minute or less at atmospheric pressure.

53. The method of claim 52 wherein said coating composition comprises from about 10 to about 24 parts by weight polymerizable hydrated alkali silicate powder; from about 5 to about 20 parts by weight forming agent; and from about 14 to about 23 parts by weight water.

54. The method of claim 52 wherein said polyvalent metal ions are selected from the group consisting of zinc, aluminum, zirconium, and mixtures thereof.

55. The method of claim 52 wherein the stoichiometric ratio of said polyvalent metal ion to said alkali silicate is at least 1.

56. The method of claim 52 wherein said hydrated silicate powder comprises a spray-dried hydrated alkali metal silicate powder.

57. The method of claim 53 wherein said hydrated silicate powder comprises a spray-dried hydrated alkali metal silicate powder.

58. The method of claim 54 wherein said hydrated silicate powder comprises a spray-dried hydrated alkali metal silicate powder.

59. The method of claim 55 wherein said hydrated silicate powder comprises a spray-dried hydrated alkali metal silicate powder.

60. The method of claim 52 wherein said coating composition further comprises insulative microspheres.

61. The method of claim 53 wherein said coating composition further comprises insulative microspheres.

62. The method of claim 54 wherein said coating composition further comprises insulative microspheres.

63. The method of claim 55 wherein said coating composition further comprises insulative microspheres.

64. The method of claim 56 wherein said coating composition further comprises insulative microspheres.

65. The method of claim 57 wherein said coating composition further comprises insulative microspheres.

66. The method of claim 58 wherein said coating composition further comprises insulative microspheres.

67. The method of claim 59 wherein said coating composition further comprises insulative microspheres.

68. The method of claim 52 wherein said coating composition further comprises a material selected from the group consisting of heat resistant whiskers, fibers and combinations thereof.

69. The method of claim 53 wherein said coating composition further comprises a material selected from the group consisting of heat resistant whiskers, fibers and combinations thereof.

70. The method of claim 54 wherein said coating composition further comprises a material selected from the group consisting of heat resistant whiskers, fibers and combinations thereof.

71. The method of claim 55 wherein said coating composition further comprises a material selected from the group consisting of heat resistant whiskers, fibers and combinations thereof.

72. The method of claim 56 wherein said coating composition further comprises a material selected from the group consisting of heat resistant whiskers, fibers and combinations thereof.

73. The method of claim 57 herein said coating composition further comprises a material selected from the group consisting of heat resistant whiskers, fibers and combinations thereof.

74. The method of claim 58 wherein said coating composition further comprises a material selected from the group consisting of heat resistant whiskers, fibers and combinations thereof.

75. The method of claim 59 wherein said coating composition further comprises a material selected from the group consisting of heat resistant whiskers, fibers and combinations thereof.

76. The method of claim 60 wherein said coating composition further comprises a material selected from the group consisting of heat resistant whiskers, fibers and combinations thereof.

77. The method of claim 61 wherein said coating composition further comprises a material selected from the group consisting of heat resistant whiskers, fibers and combinations thereof.

78. The method of claim 62 wherein said coating composition further comprises a material selected from the group consisting of heat resistant whiskers, fibers and combinations thereof.

79. The method of claim 63 wherein said coating composition further comprises a material selected from the group consisting of heat resistant whiskers, fibers and combinations thereof.

80. The method of claim 64 wherein said coating composition further comprises a material selected from the group consisting of heat resistant whiskers, fibers and combinations thereof.

81. The method of claim 65 wherein said coating composition further comprises a material selected from the group consisting of heat resistant whiskers, fibers and combinations thereof.

82. The method of claim 66 wherein said coating composition further comprises a material selected from the group consisting of heat resistant whiskers, fibers and combinations thereof.

83. The method of claim 52 wherein the stoichiometric ratio of said polyvalent metal ion to said hydrated silicate is at least 1.

84. The method of claim 53 wherein the stoichiometric ratio of said polyvalent metal ion to said hydrated silicate is at least 1.

85. The method of claim 54 wherein the stoichiometric ratio of said polyvalent metal ion to said hydrated silicate is at least 1.

86. The method of claim 55 wherein the stoichiometric ratio of said polyvalent metal ion to said hydrated silicate is at least 1.

87. The method of claim 56 wherein the stoichiometric ratio of said polyvalent metal ion to said hydrated silicate is at least 1.

88. The method of claim 57 wherein the stoichiometric ratio of said polyvalent metal ion to said hydrated silicate is at least 1.

89. The method of claim 58 wherein the stoichiometric ratio of said polyvalent metal ion to said hydrated silicate is at least 1.

90. The method of claim 59 wherein the stoichiometric ratio of said polyvalent metal ion to said hydrated silicate is at least 1.

91. The method of claim 60 wherein the stoichiometric ratio of said polyvalent metal ion to said hydrated silicate is at least 1.

92. The method of claim 61 wherein the stoichiometric ratio of said polyvalent metal ion to said hydrated silicate is at least 1.

93. The method of claim 62 wherein the stoichiometric ratio of said polyvalent metal ion to said hydrated silicate is at least 1.

94. The method of claim 63 wherein the stoichiometric ratio of said polyvalent metal ion to said hydrated silicate is at least 1.

95. The method of claim 64 wherein the stoichiometric ratio of said polyvalent metal ion to said hydrated silicate is at least 1.

96. The method of claim 65 wherein the stoichiometric ratio of said polyvalent metal ion to said hydrated silicate is at least 1.

97. The method of claim 66 wherein the stoichiometric ratio of said polyvalent metal ion to said hydrated silicate is at least 1.

98. The method of claim 67 wherein the stoichiometric ratio of said polyvalent metal ion to said hydrated silicate is at least 1.

99. The method of claim 68 wherein the stoichiometric ratio of said polyvalent metal ion to said hydrated silicate is at least 1.

100. The method of claim 69 wherein the stoichiometric ratio of said polyvalent metal ion to said hydrated silicate is at least 1.

101. The method of claim 70 wherein the stoichiometric ratio of said polyvalent metal ion to said hydrated silicate is at least 1.

102. The method of claim 71 wherein the stoichiometric ratio of said polyvalent metal ion to said hydrated silicate is at least 1.

103. The method of claim 72 wherein the stoichiometric ratio of said polyvalent metal ion to said hydrated silicate is at least 1.

104. The method of claim 73 wherein the stoichiometric ratio of said polyvalent metal ion to said hydrated silicate is at least 1.

105. The method of claim 74 wherein the stoichiometric ratio of said polyvalent metal ion to said hydrated silicate is at least 1.

106. The method of claim 75 wherein the stoichiometric ratio of said polyvalent metal ion to said hydrated silicate is at least 1.

107. The method of claim 76 wherein the stoichiometric ratio of said polyvalent metal ion to said hydrated silicate is at least 1.

108. The method of claim 77 wherein the stoichiometric ratio of said polyvalent metal ion to said hydrated silicate is at least 1.

109. The method of claim 78 wherein the stoichiometric ratio of said polyvalent metal ion to said hydrated silicate is at least 1.

110. The method of claim 79 wherein the stoichiometric ratio of said polyvalent metal ion to said hydrated silicate is at least 1.

111. The method of claim 80 wherein the stoichiometric ratio of said polyvalent metal ion to said hydrated silicate is at least 1.

112. The method of claim 81 wherein the stoichiometric ratio of said polyvalent metal ion to said hydrated silicate is at least 1.

113. A method comprising:
contacting a surface comprising metal with a coating composition comprising a polymerizable hydrated silicate powder comprising alkali metal ions, a forming agent comprising polyvalent metal ions, and an amount and form of moisture effective to promote ion exchange between said polyvalent metal ions and said alkali metal ions;
curing said coating composition under first curing conditions effective to maintain a sufficient amount of said moisture in said coating composition to promote said ion exchange while under said first curing conditions and for a time effective to initiate polymerization of said silicate powder and to promote said ion exchange, producing an intermediate coating composition comprising bound water molecules, said first conditions comprising heating said intermediate coating composition under third conditions comprising a temperature of from about 150° F. to about 350° F., a pressure of from about 4 to about 135 psi, and a time of from about 3 to about 5 hours; and
imparting sufficient energy to said coating composition at a rate and under second curing conditions effective to drive said bound water molecules from said intermediate coating composition and to produce a durable, adhesive protective coating.

114. A method comprising:
contacting a surface comprising metal with a coating composition comprising a polymerizable hydrated silicate powder comprising alkali metal ions, a forming agent comprising polyvalent metal ions selected from the group consisting of zinc, aluminum, zirconium, and mixtures thereof, and an amount and form of moisture effective to promote ion exchange between said polyvalent metal ions and said alkali metal ions;
curing said coating composition under first curing conditions effective to maintain a sufficient amount of said moisture in said coating composition to promote said ion exchange while under said first curing conditions and for a time effective to initiate polymerization of said silicate powder and to promote said ion exchange, producing an intermediate coating composition comprising bound water molecules, said first curing conditions comprising maintaining said coated surface in a closed environment at ambient temperature for a period of time and heating said intermediate coating composition under third conditions comprising a temperature of from about 150° F. to about 350° F., a pressure of from about 4 to about 135 psi, and a time of from about 3 to about 5 hours; and,
imparting sufficient energy to said coating composition at a rate and under second curing conditions effective to drive said bound water molecules from said intermediate coating composition and to produce a durable, adhesive protective coating.

115. A method comprising:
contacting a surface comprising metal with a coating composition comprising a polymerizable hydrated silicate powder comprising alkali metal ions, a forming agent comprising polyvalent metal ions, and an amount and form of moisture effective to promote ion exchange between said polyvalent metal ions and said alkali metal ions;
curing said coating composition under first curing conditions effective to maintain a sufficient amount of said moisture in said coating composition to promote said ion exchange while under said first curing conditions and for a time effective to initiate polymerization of said silicate powder and to promote said ion exchange, producing an intermediate coating composition comprising bound water molecules, said first curing conditions comprising maintaining said coated surface in a closed environment at ambient temperature for a period of time of from about 8 to about 20 hours and heating said intermediate coating composition under third conditions comprising a temperature of from about 150° F. to about 350° F., a pressure of from about 4 to about 135 psi, and a time of from about 3 to about 5 hours; and
imparting sufficient energy to said coating composition at a rate and under second curing conditions effective to drive said bound water molecules from said intermediate coating composition and to produce a durable, adhesive protective coating.

116. A method comprising:
contacting a surface comprising metal with a coating composition comprising a polymerizable hydrated silicate powder comprising alkali metal ions, a forming agent comprising polyvalent metal ions selected from the group consisting of zinc, aluminum, zirconium, and mixtures thereof, and an amount and form of moisture effective to promote ion exchange between said polyvalent metal ions and said alkali metal ions;
curing said coating composition under first curing conditions effective to maintain a sufficient amount of said moisture in said coating composition to promote said ion exchange while under said first curing conditions and for a time effective to initiate polymerization of said silicate powder and to promote said ion exchange, producing an intermediate coating composition comprising bound water molecules, said first curing conditions comprising heating said intermediate coating composition under third conditions comprising a temperature of from about 150° F. to about 350° F., a pressure of from about 4 to about 135 psi, and a time of from about 3 to about 5 hours; and imparting sufficient energy to said coating composition at a rate and under second curing conditions effective to drive said bound water molecules from said intermediate coating composition and to produce a durable, adhesive protective coating.

117. A method comprising:

contacting a surface comprising metal with a coating composition comprising a polymerizable hydrated silicate powder comprising alkali metal ions, a forming agent comprising polyvalent metal ions, and an amount and form of moisture effective to promote ion exchange between said polyvalent metal ions and said alkali metal ions;

curing said coating composition under first curing conditions effective to maintain a sufficient amount of said moisture in said coating composition to promote said ion exchange while under said first curing conditions and for a time effective to initiate polymerization of said silicate powder and to promote said ion exchange, producing an intermediate coating composition comprising bound water molecules, said first curing conditions comprising heating said intermediate coating composition under third conditions comprising a temperature of from about 150° F. to about 350° F., a pressure of from about 4 to about 135 psi, and a time of from about 3 to about 5 hours; and imparting sufficient energy to said coating composition at a rate and under second curing conditions effective to drive said bound water molecules from said intermediate coating composition and to produce a durable, adhesive protective coating, said second curing conditions comprising heating said intermediate coating composition to about 1,000° F. or more at atmospheric pressure.

118. A method comprising:

contacting a surface comprising metal with a coating composition comprising a polymerizable hydrated silicate powder comprising alkali metal ions, a forming agent comprising polyvalent metal ions, and an amount and form of moisture effective to promote ion exchange between said polyvalent metal ions and said alkali metal ions;

curing said coating composition under first curing conditions effective to maintain a sufficient amount of said moisture in said coating composition to promote said ion exchange while under said first curing conditions and for a time effective to initiate polymerization of said silicate powder and to promote said ion exchange, producing an intermediate coating composition comprising bound water molecules, said first curing conditions comprising maintaining said coated surface in a closed environment at ambient temperature for a period of time of from about 8 to about 20 hours and heating said intermediate coating composition under third conditions comprising a temperature of from about 150° F. to about 350° F., a pressure of from about 4 to about 135 psi, and a time of from about 3 to about 5 hours; and imparting sufficient energy to said coating composition at a rate and under second curing conditions effective to drive said bound water molecules from said intermediate coating composition and to produce a durable, adhesive protective coating, said second curing conditions comprising heating said intermediate coating composition to about 1,000° F. or more at atmospheric pressure.

119. The method of claim 113 wherein said rate is about 20° F./min. or less.

120. The method of claim 114 wherein said rate is about 20° F./min. or less.

121. The method of claim 115 wherein said rate is about 20° F./min. or less.

122. The method of claim 116 wherein said rate is about 20° F./min. or less.

123. The method of claim 117 wherein said rate is about 20° F./min. or less.

124. The method of claim 118 wherein said rate is about 20° F./min. or less.

125. The method of claim 113 wherein said hydrated silicate powder comprises a spray-dried hydrated alkali metal silicate powder.

126. The method of claim 114 wherein said hydrated silicate powder comprises a spray-dried hydrated alkali metal silicate powder.

127. The method of claim 115 wherein said hydrated silicate powder comprises a spray-dried hydrated alkali metal silicate powder.

128. The method of claim 116 wherein said hydrated silicate powder comprises a spray-dried hydrated alkali metal silicate powder.

129. The method of claim 117 wherein said hydrated silicate powder comprises a spray-dried hydrated alkali metal silicate powder.

130. The method of claim 118 wherein said hydrated silicate powder comprises a spray-dried hydrated alkali metal silicate powder.

131. The method of claim 119 wherein said hydrated silicate powder comprises a spray-dried hydrated alkali metal silicate powder.

132. The method of claim 120 wherein said hydrated silicate powder comprises a spray-dried hydrated alkali metal silicate powder.

133. The method of claim 121 wherein said hydrated silicate powder comprises a spray-dried hydrated alkali metal silicate powder.

134. The method of claim 122 wherein said hydrated silicate powder comprises a spray-dried hydrated alkali metal silicate powder.

135. The method of claim 123 wherein said hydrated silicate powder comprises a spray-dried hydrated alkali metal silicate powder.

136. The method of claim 124 wherein said hydrated silicate powder comprises a spray-dried hydrated alkali metal silicate powder.

137. The method of claim 113 wherein said coating composition further comprises insulative microspheres.

138. The method of claim 114 wherein said coating composition further comprises insulative microspheres.

139. The method of claim 115 wherein said coating composition further comprises insulative microspheres.

140. The method of claim 116 wherein said coating composition further comprises insulative microspheres.

141. The method of claim 117 wherein said coating composition further comprises insulative microspheres.

142. The method of claim 118 wherein said coating composition further comprises insulative microspheres.

143. The method of claim 124 wherein said coating composition further comprises insulative microspheres.

144. The method of claim 130 wherein said coating composition further comprises insulative microspheres.

145. The method of claim 136 wherein said coating composition further comprises insulative microspheres.

146. The method of claim 113 wherein the stoichiometric ratio of said polyvalent metal ion to said hydrated silicate is at least 1.

147. The method of claim 114 wherein the stoichiometric ratio of said polyvalent metal ion to said hydrated silicate is at least 1.

148. The method of claim 115 wherein the stoichiometric ratio of said polyvalent metal ion to said hydrated silicate is at least 1.

149. The method of claim 116 wherein the stoichiometric ratio of said polyvalent metal ion to said hydrated silicate is at least 1.

150. The method of claim 117 wherein the stoichiometric ratio of said polyvalent metal ion to said hydrated silicate is at least 1.

151. The method of claim 118 wherein the stoichiometric ratio of said polyvalent metal ion to said hydrated silicate is at least 1.

152. The method of claim 119 wherein the stoichiometric ratio of said polyvalent metal ion to said hydrated silicate is at least 1.

153. The method of claim 124 wherein the stoichiometric ratio of said polyvalent metal ion to said hydrated silicate is at least 1.

154. The method of claim 125 wherein the stoichiometric ratio of said polyvalent metal ion to said hydrated silicate is at least 1.

155. The method of claim 139 wherein the stoichiometric ratio of said polyvalent metal ion to said hydrated silicate is at least 1.

156. The method of claim 136 wherein the stoichiometric ratio of said polyvalent metal ion to said hydrated silicate is at least 1.

157. A method for producing a durable, adhesive protective coating comprising:
  means for applying a coating composition to a surface to produce a coated surface;
  means for maintaining said coated surface in a closed environment;
  means for heating said coated surface to produce an intermediate coating composition; and
  means for drying said intermediate coating composition to produce said durable, adhesive coating.

* * * * *

UNITED STATES PATENT AND TRADEMARK OFFICE
CERTIFICATE OF CORRECTION

PATENT NO. : 6,376,022 B1
DATED : April 23, 2002
INVENTOR(S) : Wellinghoff et al.

It is certified that error appears in the above-identified patent and that said Letters Patent is hereby corrected as shown below:

<u>Column 1,</u>
Line 14, please delete the word "Safety" and insert -- Space --.

Signed and Sealed this

Third Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,376,022 B1
DATED : April 23, 2002
INVENTOR(S) : Mallow et al.

It is certified that error appears in the above-identified patent and that said Letters Patent is hereby corrected as shown below:

Column 1,
Line 14, please delete the word "Safety" and insert -- Space --.

This certificate supersedes Certificate of Correction issued December 3, 2002.

Signed and Sealed this

Eighth Day of April, 2003

JAMES E. ROGAN
*Director of the United States Patent and Trademark Office*